United States Patent Office 3,060,170
Patented Oct. 23, 1962

3,060,170
PROCESS FOR INCREASING THE VISCOSITY OF PHOSPHATE-MODIFIED STARCHES
Jacob W. Sietsema, Minneapolis, Minn., and Linda K. Mandell, Newport Beach, Calif., assignors to International Minerals & Chemical Corporation, a corporation of New York
No Drawing. Filed Oct. 3, 1960, Ser. No. 59,781
7 Claims. (Cl. 260—233.5)

This invention relates to an improved process for preparing high-viscosity phosphate-modified starches. In a preferred aspect, the present invention relates to an improved process for substantially increasing the viscosity of phosphate-modified starches of the Neukom type wherein high viscosities are obtained in greater yield with smaller quantities of material than processes previously employed.

The preparation of alkali-metal phosphate-modified starches is described by Hans Neukom in U.S. Patent No. 2,865,762 and U.S. Patent No. 2,884,412 which issued, respectively, on December 23, 1958, and April 28, 1959. In the Neukom method, starch is impregnated with an aqueous solution of an orthophosphate salt, dried to a moisture content less than about 15% by weight, then heated to an elevated temperature at which the substance reacts in a way not readily understood, producing a modified starch of ready dispersibility in cold water. The starches produced in accordance with the procedure described by Neukom are classed as technical grade starch phosphates and usually have a viscosity in 5% aqueous solutions ranging from as low as about 1,000 to about 20,000 centipoises, generally about 5,000 to 15,000 centipoises. For many purposes, it is desirable to have a product having a viscosity in excess of 50,000 centipoises and even over 100,000 centipoises, and to this extent it has been necessary in the past to purify and fractionate a technical grade starch phosphate to recover a product having the desirably high viscosity.

The process which has been employed in the past to produce high viscosity Neukom type phosphate-modified starches is described in copending U.S. patent application of Jacob W. Sietsema and William C. Trotter, Serial No. 637,351, filed January 31, 1957, now U.S. Patent No. 2,993,041. While the procedure described therein is effective for achieving the desired result, it requires a large quantity of solvent, for example, about 25 pounds of solvent per pound of technical starch phosphate processed, and usually at least three precipitations are necessary to achieve a product having a viscosity in excess of 50,000 centipoises. Also, in view of the number of precipitations and washings required in the prior process, there is ample opportunity for loss of product which results in lower yields. In our process, we are able to obtain a product having a viscosity in the range of 50,000 centipoises to 100,000 centipoises or more using as little as 2.4 pounds of solvent per pound of technical grade starch phosphate. Further, we have discovered that these results can be achieved without the need for a precipitation step as has been required in previous processes. We have also discovered that the yield achieved by our improved process is increased to approximately 90% as compared with approximately 75% by the older method.

It is, therefore, an object of the present invention to provide an improved process for the preparation of high-viscosity Neukom type starch phosphates.

It is another object of this invention to provide an improved process for increasing the viscosity of technical grade Neukom type starch phosphates to a range in excess of 50,000 centipoises by a simplified procedure affording considerable savings in time and reagents and achieving increased yields over previously use methods.

These and other objects of the invention will be apparent from the description which follows.

The process of the present invention employs as a starting material technical grade alkali-metal phosphate-modified starches of the Neukom type including those prepared from potato starch, cornstarch, wheat starch, cassava starch, arrowroot starch and the like as described in detail in the two U.S. patents referred to hereinbefore. For purposes of simplification and definition, these products are referred to as Neukom type starches.

In accordance with the present invention, a technical grade Neukom type phosphate-modified starch is dispersed in concentrations ranging between about 15 and about 35 weight percent into an aqueous solution containing between about 25 and about 45 volume percent of an inert oxygen-containing water-miscible organic liquid, such as methanol, acetone, or the like as will be more fully described hereinafter. The resulting dispersion, which in general is a suspension, is agitated and treated with chlorine until the supernatant turns a green color. The character of this color is not understood but we have determined that the treatment with chlorine until this green color is achieved is of considerable significance in preparing a final product having not only a nice white color, but also the high viscosity desired in the product. In general, the green color is achieved by bubbling chlorine gas through the suspension. When the supernatant assumes the aforementioned green color, the solids are separated from the liquid phase and washed with a solvent comprising an inert oxygen-containing, water-miscible organic liquid, preferably common to that used in the original dispersion, to remove the occluded water and any undesirable impurities or low viscosity starch phosphate products dissolved therein. This wash may be accomplished by employing either the pure solvent in a single wash or by two washings wherein the separated solids are first washed with an aqueous solution of the solvent followed by a final washing with dry solvent. The product can then be dried, preferably air-dried at a temperature below the point at which gelatinization might occur. The resulting material is the improved composition of the invention and contains a decreased proportion of inorganic phosphates, low viscosity starch phosphates, and other impurities. Further, aqueous solutions thereof are substantially higher in viscosity than aqueous solutions of the starting material.

In preparing the phosphate-modified starches of Neukom, starch is heated at a temperature between about 120 and about 175° C. with certain phosphate salts. In one representative method, dry, ungelatinized starch is immersed in an aqueous solution of an alkali-metal orthophosphate, the liquid phase is removed and the solids dried to less than about 15% moisture after which they are heated for around 1 to 15 hours at about 130 to 170° C., preferably about 5 hours at about 160° C. The length of the heating period varies inversely with the temperature. A cold water-soluble starch is obtained thereby having a viscosity between about 1,000 and about 20,000 centipoises, measured in 5% aqueous solution at room temperature.

Preferred phosphate salts are sodium, potassium and lithium orthophosphates, alone or in suitable combinations to yield a pH in aqueous solution between about 4 and about 7, preferably around 6, measured at 25° C. at the concentration employed. For example, monosodium orthophosphate and disodium orthophosphate are combined in aqueous solution in such proportions as to produce a pH between about 6 and about 7. Or the desired salts may be formed in situ, for example by dissolving trisodium orthophosphate or other basic phosphate salt in water and adjusting the pH of the solution to the desired level by adding orthophosphoric acid or an acidic orthophosphate salt. Alternatively, orthophosphoric acid or an acidic phosphate salt in aqueous solution may be adjusted upward to the desired pH by adding an alkali-metal hydroxide or a basic alkali-metal orthophosphate salt.

The phosphate solution may suitably be between about 1 and about 3 molar concentration in phosphate and should be used in a quantity equivalent to at least about 1% by weight of phosphorus, preferably between about 3 and about 5%, based on the quantity of starch to be treated. The quantity and concentration of solution should be chosen so that the starch will form a slurry when commingled therewith. The quantity of starch will generally be less than 1.5 times the weight of the water contained in the solution, and will preferably be less than the weight of water. The slurry should be agitated or stirred for 5 to 10 minutes or more to permit the starch granules to become soaked with the solution.

The soaked starch granules are separated from the solution by filtration, centrifugation, or the like, and the liquid phase is largely removed, suitably by air drying at a temperature below the point at which starch gelantinizes, e.g., below about 60 to 80° C., depending upon the particular starch. The resulting granules, which generally contain between about 8 and about 15% of water, are subjected to a heat treatment as set forth hereinabove. The heat-treated material is a technical grade phosphate-modified starch suitable for use as the starting material in our invention.

The organic liquid employed in the present invention is an oxygen-containing water-miscible organic substance which is inert toward the contents of the purification medium under the conditions employed. Such substances, when used as defined above, are anti-solvents for high-viscosity alkali-metal phosphate-modified starches and for the acidic forms thereof, but not for the various impurities existing therein. Suitable liquids include acetone, dioxane, tetrahydrofurfuryl alcohol, the water-miscible aliphatic monohydric alcohols, e.g., methanol, ethanol, n-propyl alcohol, and isopropyl alcohol; the water-miscible aliphatic polyhydric alcohols, such as ethylene glycol, propylene glycol, glycerol, and the like; the water-miscible aliphatic ether-alcohols, such as ethylene glycol methyl ether and diethylene glycol ethyl ether; the water-miscible glycol diethers, such as diethylene glycol diethyl ether; and the like.

In carrying out the process of the present invention, a quantity of the technical grade phosphate-modified starch described hereinabove is suspended in a proportion between about 15 and about 35% by weight in an aqueous solution containing between about 20 and about 45 volume percent of the organic liquid described hereinabove. The temperature at which the suspension is formed is preferably room temperature. However, we have found that if lower temperatures are employed, the concentration of the organic liquid in the aqueous solution can be decreased without unduly affecting the results achieved by the process. When the starting material is in the form of a dry powder, it may tend to cake when first added to the aqueous solution of organic solvent. This can be prevented by first wetting with a small quantity of the organic solvent common to that used in the suspending medium. In preparing this suspension, agitation is employed to insure a high degree of solution of the low viscosity starch phosphates, inorganic phosphates, and other impurities. The suspension is then treated with chlorine gas by bubbling it therethrough until the supernatant assumes a green color after which the solids are separated from the liquid phase either by filtration or centrifugation, preferably the latter. The solids are then washed with about 1.8 parts by weight of an aqueous solution of the character used in the first suspension per part of original technical grade starch phosphate and containing between about 20 and about 45 volume percent of organic liquid, preferably the same concentration as the original solution. The solids are then washed with about 1.2 parts by weight of the dry organic liquid per part of original technical grade starch phosphate. The washed solids can then be dried, suitably in air, and at a temperature not exceeding about 80° C. The removal of the water prior to drying is desirable in order to avoid hydrolysis, saponification, gelatinization, and other side reactions during the drying operation. For many applications, the organic liquid need not be removed and the wet washed solids can be used without further treatment. In either event, the final product is a phosphate-modified starch having a substantially higher viscosity compared with the starting material, usually in the range between about 70,000 and 100,000 centipoises in 5% aqueous solutions at room temperature.

In a preferred embodiment of the process of the present invention, methanol is employed as the inert oxygen-containing water-miscible organic liquid and a suspension is prepared containing about 30 weight percent of technical grade modified starch in 35 volume percent aqueous methanol. The suspension is agitated and chlorine gas is bubbled therethrough until the supernatant assumes a green color. The slurry is filtered immediately and the solids washed with about 1.8 parts by weight of 35% aqueous methanol per part of technical grade starch phosphate and then with 1.2 parts by weight of dry methanol per part of original starch phosphate. The product is then dried in an air oven at a temperature of between about 70 and about 80° C.

The products of the present improved process are especially useful as thickening agents in food products such as soups, ice cream, puddings, salad dressings, mayonnaise, pie filling and the like. They are also useful as sizing agents in the surface finishing of paper and textiles as beater additives in paper making prior to mat formation, as inhibitors of water loss in oil well drilling muds, as core binders in the preparation of foundry cores, and as desliming agents in potash ore flotation.

The phosphate-modified starches form clear dispersions in water which are more or less viscous, depending upon concentration, and which are believed to be more or less colloidal in nature. Such dispersions may be referred to as "solutions," viz., colloidal solutions, but it is not intended to imply that the dispersions may be true solutions.

All viscosity measurements described herein were made on 5% aqueous solutions at room temperature (about 25° C.) with a Brookfield "Synchro-Lectric" viscometer manufactured by Brookfield Engineering Laboratories, Cushing, Mass., employing spindles and speeds as follows:

| Viscosity Range, cp. | Spindle No. | Speed, r.p.m. |
| --- | --- | --- |
| 0–10,000 | 3 | 12 |
| 10,000–50,000 | 4 | 12 |
| 50,000–100,000 | 4 | 6 |

The following examples are intended to illustrate the underlying principles of the present invention and are not to be construed as unduly limiting thereof.

*Example I*

A technical grade of Neukom type phosphate-modified starch was prepared by mixing 5.0 pounds of Amaizo PF cornstarch with an aqueous solution containing 2.59 pounds of water, .655 pound of $Na_2HPO_4 \cdot 2H_2O$, and .257 pound of $NaH_2PO_4 \cdot H_2O$ in an Abbé mixer at a temperature of about 25° C. for a period of about 15 minutes. The product was then dried at 60° C. overnight. The dried product was then baked for six hours at a temperature of from 140 to 160° C. The final product had a viscosity after grinding of about 14,000 centipoises in 5% aqueous solution at room temperature.

Employing the technical grade starch phosphate prepared as described hereinabove, three suspensions were prepared employing, respectively, 30, 35, and 40 volume percent methanol as the suspending medium. In each instance, 25.8 grams of the technical grade starch phosphate was suspended at room temperature in 60.8 grams of the aqueous solutions. Chlorine gas was bubbled through each of the suspensions until the supernatant turned green and was immediately filtered in a basket type centrifuge. In each case, the separated solids were washed with 45.7 grams of aqueous methanol having the same volume concentration as was employed in the original suspending medium and finally washed with 30.5 grams of dry methanol. The products in each instance were dried overnight at 70–80° C. In the run employing 40 volume percent methanol, 24.4 grams of final product was obtained representing a yield of 94.5%. In the run employing 35 volume percent methanol, 23.8 grams of product was obtained representing 92.2. In the run employing 30 volume percent 23.4 grams of final product was obtained representing a yield of 91.8%. In all instances, the products had a viscosity in excess of 100,000 centipoises (No. 4 spindle at 6 r.p.m.). The foregoing data illustrate that on the average only about 2.4 grams of methanol per gram of technical grade starch phosphate was used to achieve exceptionally high viscosities. The density of methanol was taken as 0.8 gram per ml.

*Example II*

25.8 grams of the technical grade starch phosphate employed in Example I were suspended in 60.8 grams of 30 volume percent aqueous methanol and chlorine gas was bubbled through the suspension until the supernatant turned green. The solids were then separated from the aqueous phase in a basket type centrifuge and washed with 50 grams of dry methanol and dried in an air oven at 70–80° C. 23.3 grams of product was obtained representing a yield of 90.4% having a viscosity in excess of 100,000 centipoises (No. 4 spindle at 6 r.p.m.). 2.6 grams of methanol per gram of technical grade starch phosphate was used to achieve the high viscosity product.

*Example III*

In this example a technical grade starch phosphate made from Amaizo PF cornstarch by the procedure outlined and having an original viscosity of 12,400 centipoises was employed. 25 grams of the technical grade starch phosphate was suspended at 15° C. in an aqueous solution containing 21.6 ml. of methanol and 41.8 ml. of water. The low temperature was maintained and chlorine gas was bubbled through the suspension with slight agitation until the supernatant turned green. The solids were separated in a basket type centrifuge and washed first at 15° C. with an aqueous solution containing 16.4 ml. of methanol and 31.6 ml. of water followed by the final wash at room temperature with 37.4 ml. of dry methanol. The resulting product had a viscosity in excess of 100,000 centipoises (spindle No. 4 at 6 r.p.m.). About 2.4 grams of methanol per gram of technical grade starch phosphate was used.

*Example IV*

The procedure of Example III was repeated using a technical grade starch phosphate having an original viscosity of 7,500 centipoises. The quantities, concentrations and temperatures were identical with those employed in Example III. The resulting product had a final viscosity in excess of 100,000 centipoises (No. 4 spindle 6 r.p.m.).

While this invention has been described and exemplified in terms of a preferred embodiment, it will be appreciated that numerous modifications and improvements can be employed without departing from the spirit and scope of this invention.

We claim:

1. An improved process for increasing the viscosity of a technical grade alkali-metal phosphate-modified starch obtained by reaction of starch with an alkali metal orthophosphate at a temperature between about 120 and about 175° C. which comprises forming a dispersion containing between about 15 and about 35 weight percent of technical grade starch phosphate in an aqueous solution containing between about 20 and about 45 volume percent of an inert oxygen-containing water-miscible organic liquid; agitating the resulting dispersion and treating the same with chlorine until the supernatant assumes a green color; separating the solids from the liquid phase; washing the separated solids with solvent comprising an inert oxygen-containing water-miscible organic liquid common to the original dispersion; and recovering an alkali-metal phosphate-modified starch of substantially increased viscosity.

2. A process according to claim 1 wherein the inorganic oxygen-containing, water-miscible organic liquid is a water-miscible aliphatic monohydric alcohol.

3. An improved process for increasing the viscosity of an alkali-metal phosphate-modified starch fraction obtained by reaction of starch with an alkali-metal orthophosphate at a temperature between about 120 and about 175° C. which comprises forming a dispersion containing between about 15 and about 35 weight percent of technical grade starch phosphate in an aqueous solution containing between about 20 and about 45 volume percent of a water-miscible aliphatic monohydric alcohol; agitating the resulting dispersion and treating the same with chlorine until the supernatant assumes a green color; separating the solids from the liquid phase; washing the separated solids with solvent comprising a water-miscible aliphatic monohydric alcohol common to the original dispersion; and recovering an alkali-metal phosphate-modified starch of substantially increased viscosity.

4. A process according to claim 3 wherein the water-miscible aliphatic monohydric alcohol is methanol.

5. An improved process for increasing the viscosity of a technical grade alkali-metal phosphate-modified starch obtained by soaking starch in an aqueous solution of an alkali-metal orthophosphate, separating the starch from said solution, drying the starch to a water content below about 15% at a temperature below the point at which starch gelatinizes, and heating the starch at a temperature between about 130 and about 170° C. for about 1 to about 15 hours, which process comprises forming a dispersion containing between about 15 and about 35 weight percent of a technical grade starch phosphate in an aqueous solution containing between about 20 and about 45 volume percent of methanol, continuously bubbling chlorine gas through said dispersion until the supernatant assumes a green color; separating the solids from the liquid phase; washing the suspended solids with about 1.7 parts by weight of methanol per part of original technical grade starch phosphate; and recovering an alkali-metal phosphate-modified starch of substantially increased viscosity.

6. A process according to claim 5 wherein the technical grade starch phosphate has a viscosity less than 20,000 centipoises and the final product has a viscosity in the neighborhood of 100,000 centipoises.

7. An improved process for increasing the viscosity of a technical grade alkali-metal phosphate-modified starch obtained by reaction of starch with an alkali metal orthophosphate at a temperature between about 120 and about 175° C. which comprises forming a dispersion containing about 30 weight percent technical grade starch phosphate in a solution containing between about 20 and about 40 volume percent of methanol; agitating the suspension and continuously bubbling chlorine gas therethrough until the supernatant assumes a green color; separating the solids from the liquid phase; washing the separated solids with about 1.8 parts by weight of aqueous methanol containing between about 20 and about 45 volume percent of methanol per part of original technical grade starch phosphate; washing the solids with about 1.2 parts by weight per part of starch phosphate of dry methanol; and air drying the separated solids.

References Cited in the file of this patent

UNITED STATES PATENTS

| 2,562,883 | Barham | Aug. 7, 1951 |
| 2,971,954 | Kodras | Feb. 14, 1961 |

OTHER REFERENCES

Radley: "Starch and Its Derivatives," 3rd Ed., vol. 1 (item III), 1953, Chapman and Hall Ltd., London, page 345.